(No Model.) 2 Sheets—Sheet 1.
E. BOHN.
METHOD OF TREATING COTTON SEED HULLS.
No. 437,084. Patented Sept. 23, 1890.
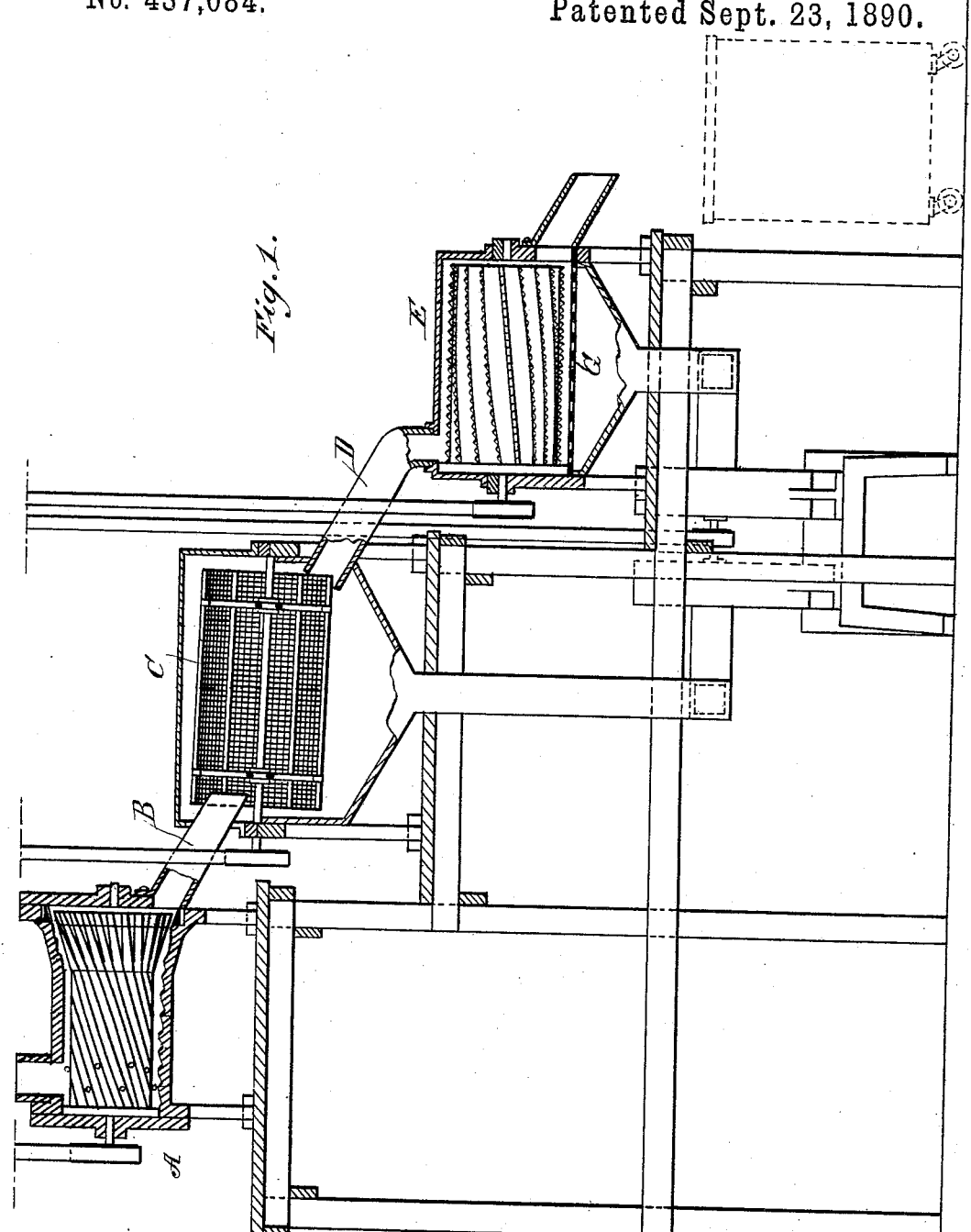
WITNESSES:
INVENTOR:
BY
ATTORNEYS.

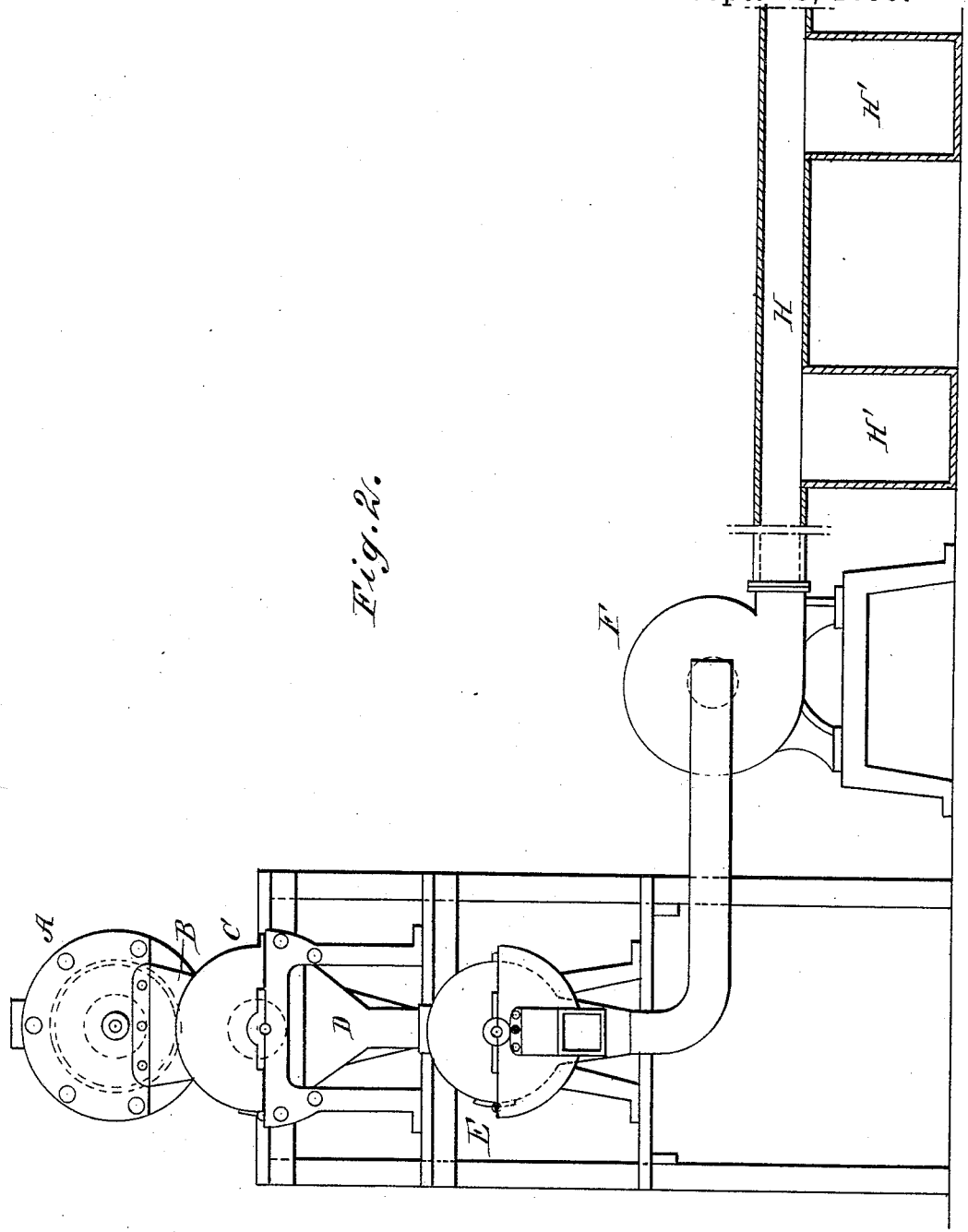

UNITED STATES PATENT OFFICE.

EMIL BOHN, OF GALVESTON, TEXAS, ASSIGNOR OF TWO-THIRDS TO THEODORE VINKE, OF SAME PLACE, AND OSCAR ENGELKE, OF BRENHAM, TEXAS.

METHOD OF TREATING COTTON-SEED HULLS.

SPECIFICATION forming part of Letters Patent No. 437,084, dated September 23, 1890.

Application filed September 19, 1889. Serial No. 324,395. (No model.)

*To all whom it may concern:*

Be it known that I, EMIL BOHN, of Galveston, in the county of Galveston and State of Texas, have invented a new and useful Method of Treating Cotton-Seed Hulls, of which the following is a full, clear, and exact description.

My invention relates to a process of producing paper-stock from cotton-seed hulls, an application, Serial No. 324,396, of even date as the present application containing the claims for the machine shown in the accompanying drawings; and the object of the invention is to utilize a heretofore waste product, and by means of a dry process to reduce the same to fine particles, which, being capable of felting, constitute a superior article for use as paper-stock.

The invention has for its further object to provide a simple and expeditious process whereby cotton-seed hulls and the attached or adherent cotton fiber heretofore considered as waste may be rendered a marketable article capable not only of use as paper-stock, but also as a felt, and wherein the product not capable of use for either of the above purposes will be separated and will constitute a superior food for cattle.

The invention mainly consists in producing paper-stock from cotton-seed hulls as removed from the seed-kernels and in the novel steps of the process employed, as will be hereinafter more fully set forth and pointed out in the claims.

Reference is to be had to the accompanying drawings, forming a part of this specification, in which similar letters of reference indicate corresponding parts in both the figures.

Figure 1 represents a central vertical section through the apparatus employed in carrying out the process, parts being shown in elevation; and Fig. 2 is an end view of the main portion of the apparatus and a side elevation partly in section, of the co-operative grading device.

In carrying out the invention the cotton-seed hulls and adherent fiber are introduced into a mill A and ground until the hulls and fiber are practically separated and reduced to comparatively small particles. The reduced product is delivered by means of a chute B from the mill to a screen, which is illustrated at C in the drawings as of a cylindrical type and capable of rotary motion.

The coarse particles not passing through the screen C are delivered by means of the chute D to the agitator E, of any approved construction, below the agitating-cylinder of which is arranged the screen G. The particles not passing through the screen G are delivered from the agitator as a marketable article of second grade. To the casings of the screen C and agitator E are connected the fans F, which draw through the said screens particles of hulls and fibers, which would not otherwise pass through, and force all the particles passing through the said screens through a covered trough or passage-way H, provided at intervals in its bottom with pockets or pits H'. As the particles pass through the passage-way H, the coarser and heavier particles of hulls drop into the first pocket or pit, while the finer and lighter particles of hulls and the fibers are carried along and deposited into the last pocket or pit. That which is deposited in the last pocket or pit consists of very fine particles of hulls and fiber and constitutes the first-grade article, while that deposited in the first pocket or pit consists, principally, of hulls and constitutes an article of food for stock. It will thus be seen that I obtain from the hulls two grades of raw paper-stock, possessing all the needful qualifications for forming paper and felting material and at the same time obtain a nutritious article of food.

Having thus described my invention, I claim as new and desire to secure by Letters Patent—

1. The herein-described method of producing raw paper-stock from cotton-seed hulls, consisting in first crushing the hulls, screening the crushed product, and then subjecting the particles not passing through the screen to a second screening while being agitated, as set forth.

2. The herein-described method of producing raw paper-stock from cotton-seed hulls, consisting in first grinding the hulls, screening the ground product, agitating the particles not passing through the screen, screening the same, and finally grading the particles passing through the screens, as specified.

EMIL BOHN.

Witnesses:
J. F. ACKER, Jr.,
EDGAR TATE.